Sept. 3, 1957     L. P. BONARI ET AL     2,805,069
EDUCATIONAL GAME DEVICE
Filed Oct. 17, 1955
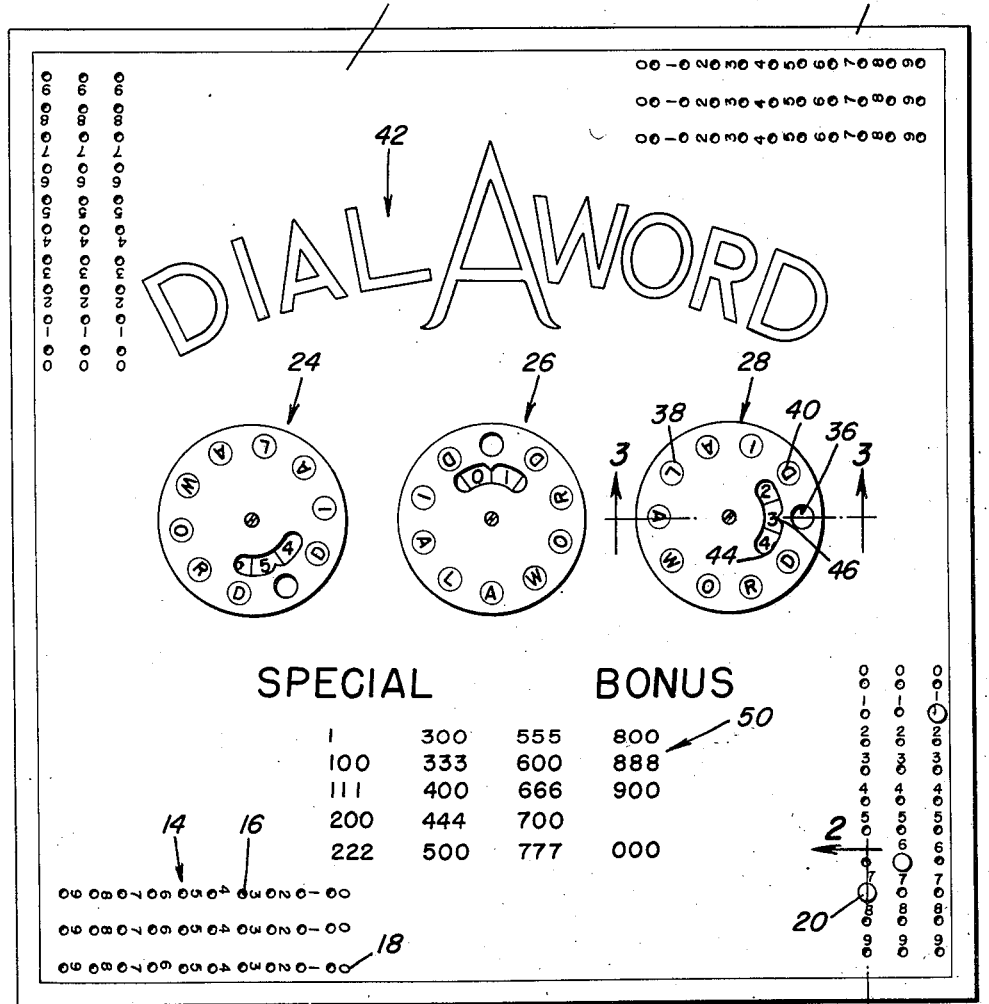
Lawrence P. Bonari
Ashley Vick
INVENTORS.

United States Patent Office 2,805,069
Patented Sept. 3, 1957

2,805,069

EDUCATIONAL GAME DEVICE

Lawrence P. Bonari and Ashley Vick, Edgewater, Md., assignors of one-third to Charles J. Trabing, Edgewater, Md.

Application October 17, 1955, Serial No. 540,868

3 Claims. (Cl. 273—135)

This invention generally relates to a game device and more specifically provides an educational game device for facilitating the teaching of the spelling of words.

An object of the present invention is to provide an educational game device employing a game board together with a plurality of blocks having certain directional indicia thereon and a standard dictionary all to be employed in playing the game with the game device of the present invention.

Another object of the present invention is to provide a game device in the form of a game board having a plurality of spinners thereon with a designating pointer associated with numerical indicia for designating a certain page of a dictionary wherein the column and word position on the particular page of the dictionary is designated by a selector block having directional indicia thereon wherein words in the dictionary will be spelled by the players of the game for facilitating the teaching of proper spelling of various words.

A still further object of the present invention is to provide an educational game device which is simple in construction, easy to use, interesting, well adapted for teaching spelling and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the game board of the present invention;

Figure 2 is a detailed sectional view taken substantially upon a plane passing along section line 2—2 of Figure 1 illustrating the construction of the scoring sockets adjacent each corner of the gameboard;

Figure 3 is a detailed sectional view taken substantially upon the plane passing along section line 3—3 of Figure 1 illustrating the construction of the spinners and the mounting therefor;

Figure 4 is a plan view of the numerical indicia associated with each of the spinners; and Figure 5 is a plan view of each type of blocks employed in the present invention wherein it will be understood that a series of each type of block is provided.

Referring now specifically to the drawings, the gameboard of the present invention is designated by the numeral 10 and is illustrated as being generally square in configuration and may be provided with a border area designated by the numeral 12 colored one distinguishable color and the central area may be another color, such as white with the border area being blue, although any combination of colors may be employed.

Adjacent each corner of the gameboard 10 is a scoring area generally designated by the numeral 14 and including a plurality of rows of sockets 16 with numerical indicia 18 disposed near each socket in each row of sockets. The outermost row of sockets 16 designates unit integers and the second or middle row of sockets 16 designates the tens integers while the innermost row of sockets 16 designates the hundreds integers thereby permitting score to be kept by insertion of pegs 20 into certain sockets 16. The pegs 20 are provided with a headed portion 22 to permit insertion of the pegs 20 into the blind sockets 16.

The lower right hand corner of Figure 1 designates three of the pegs 20 in position wherein the score designated therein is 761 since the pegs 20 are disposed in the sockets 16 designating the same.

Disposed in alignment near the center of the gameboard 10 is a plurality of spinners generally designated by the numerals 24, 26 and 28, each of which are identical in construction and the spinner 28 will be specifically described.

The spinner 28 includes a generally circular disk 30 having a mounting fastening member 32 extending through the center thereof and screw-threaded into the gameboard 10 with a friction washer 34 disposed between the disk 30 and the gameboard 10 to facilitate rotation of the disk 30. Adjacent the periphery of the disk 30 is provided an aperture 36 forming a finger receiving hole for receiving a finger for spinning the disk 30 somewhat similar in the manner of dialing a telephone.

A plurality of circles 38 are defined on the disk 30 generally equal in size to the opening 36 and the circles 38 are provided with indicia 40 wherein the disk 30 will substantially simulate the dial piece on a telephone. The indicia 40 forms a word which is also disposed arcuately on the surface of the gameboard as designated by the numeral 42 and forms a trade-name for the particular game device.

Disposed inwardly of the aperture 36 on the disk 30 is an elongated arcuate opening 44 having an inwardly extending pointer 46 on the center of the outer edge thereof for association with numerical indicia 48 disposed under the disk 30 for viewing through the arcuate slot or opening 44. The pointer 46 will designate one of the numerical indicia 48 when the disk is given a spin.

In operation, the spinner 28 designates unit integers, while the spinner 26 designates tens integers and the spinner 24 designates hundreds integers for designating a page of a dictionary.

Disposed below the spinners 24, 26 and 28 is numerical indicia generally designated by the numeral 50 which may be of different colors such as red and blue and which are designated as special bonus arrangements in a manner described hereinafter.

Figure 5 illustrates a plurality of game blocks employed in the present invention and the game blocks are indicated by the numerals 52, 54, 56, and 58. It will be understood that a complete series of each type of game block is provided and each series includes 15 blocks or any other suitable numbers. Each type of block 52, 54, 56 and 58 is provided with centrally disposed enlarged numerical indicia 60 which designates the word in the dictionary on the page designated by the spinners 24, 26 and 28. Each of the blocks is also provided with small numerical indicia 62 adjacent the lower left hand corner thereof which designates the column on the page in the dictionary on which the word is located and letter indicia 64 is disposed at the lower right hand corner of the blocks to indicate whether the word is positioned from the top or bottom of the page so that it will be designated by the numerical indicia 10. Also, certain of the blocks, such as the blocks 54 and 56 may be provided with red and blue distinguishing color marks designated by the numeral 66 which provides a special bonus in playing the game with the game device of the present invention.

One form of the game which may be played with the device of the present invention may be carried out with a plurality of players wherein the spinners may be actuated to determine who has the highest number for determining the first player. The first player then spins each of the spinners 24, 26 and 28 so that it will revolve at least one revolution after which the spinners will come to rest and the numerical indicia designated thereby will be read. For instance in Figure 1, the number designated by the spinners is 513, since the largest numeral is read in the event the pointer 54 falls between adjacent numerals. This means that the second player turns the dictionary to page 513 after which the first player inverts a selected block to a viewed position since all of the blocks have been previously turned face down. If 52 was the block that was inverted, the second player would call out the tenth word from the top on the first column of page 513 for the first player to spell and in the event he spelled the same, his score would count with one point for each letter. In the event the blocks has the bonus colors thereon, or in the event a bonus number 50 was dialed, the first player would receive additional points for spelling the word correctly. With the present device, children may be more easily taught correct spelling of words and also the game will inherently interest children in words, word formation, word spelling and meanings.

While the game device has been described and illustrated as being employed with a conventional dictionary, it will be understood that a book having a special group of words may be provided if desired. It is also pointed out that the bonus numerical indicia 50 should correspond to the number of pages in the dictionary or the book containing a group of words. This is also true of the indicia under the spinner indicating the hundreds integer whereby the designated page will definitely appear in the dictionary or special book.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. An educational game device comprising a gameboard having a generally flat upper surface, a plurality of spinners mounted on said gameboard, numerical indicia associated with each of said spinners, an indicator on each of said spinners for designating certain numerical indicia, each of said spinners including a circular disk, means rotatably mounting the disks on the gameboard, said numerical indicia underlying each of said disks, each of said disks having an arcuate aperture with a centrally disposed pointer forming the indicator for designating certain of the numerical indicia, the numerical indicia under the first disk representing unit integers, the numerical indicia under the other disks representing tens and hundreds integers for designating a page number in a dictionary, and a plurality of blocks having indicia thereon designating the column on the page of the dictionary and also pointing out the word in the column to be spelled by one of the players.

2. An educational game device comprising a gameboard having a generally flat upper surface, a plurality of spinners mounted on said gameboard, numerical indicia associated with each of said spinners, an indicator on each of said spinners for designating certain numerical indicia, each of said spinners including a circular disk, means rotatably mounting the disks on the gameboard, said numerical indicia underlying each of said disks, each of said disks having an arcuate aperture with a centrally disposed pointer forming the indicator for designating certain of the numerical indicia, the numerical indicia under the first disk representing unit integers, the numerical indicia under the other disks representing tens and hundreds integers for designating a page number in a dictionary, and a plurality of blocks having indicia thereon designating the column on the page of the dictionary and also pointing out the word in the column to be spelled by one of the players, said gameboard having numbers disposed thereon with the numbers being formed of distinguishable colors, certain of said blocks having distinguishable colors thereon designating certain of the numerals on the gameboard for addition to the total score when playing a game thereby forming a bonus.

3. A device for aiding in instruction in etymology and to be employed in combination with a conventional dictionary, said device comprising a supporting board, a plurality of disks rotatably mounted on said board, said board having sets of numerical indicia forming integers underlying each disk and normally being concealed thereby, each of said disks having an arcuate opening with a radially extending pointer in one edge thereof for indicating an integer revealed through said opening, the integers indicated by said pointers designating a page number in a conventional dictionary, and control means for designating the word on the page of the dictionary selected by the pointers, said means including selective blocks having normally concealed indicia whereby one of the blocks may be selected after the page has been designated, each of said blocks having indicia thereon indicating the position of the word on the designated page of the dictionary with information concerning the word being required of the player.

References Cited in the file of this patent

UNITED STATES PATENTS

| | | |
|---|---|---|
| 375,558 | Massa | Dec. 27, 1887 |
| 705,873 | Schinkel | July 29, 1902 |
| 711,854 | Harton | Oct. 21, 1902 |
| 1,055,151 | Emerson | Mar. 4, 1913 |
| 1,319,561 | Brenner | Oct. 21, 1919 |
| 1,349,587 | Smith | Aug. 17, 1920 |
| 1,685,723 | Robins | Sept. 25, 1928 |
| 2,312,423 | Lathers | Mar. 2, 1943 |
| 2,454,479 | Rosenberger | Nov. 23, 1948 |
| 2,487,363 | Olson | Nov. 8, 1949 |
| 2,667,345 | Mathews | Jan. 26, 1954 |

FOREIGN PATENTS

| | | |
|---|---|---|
| 229,088 | Great Britain | Feb. 19, 1925 |